May 30, 1939.    P. HUBER    2,160,332
SILENCER
Filed Jan. 23, 1937
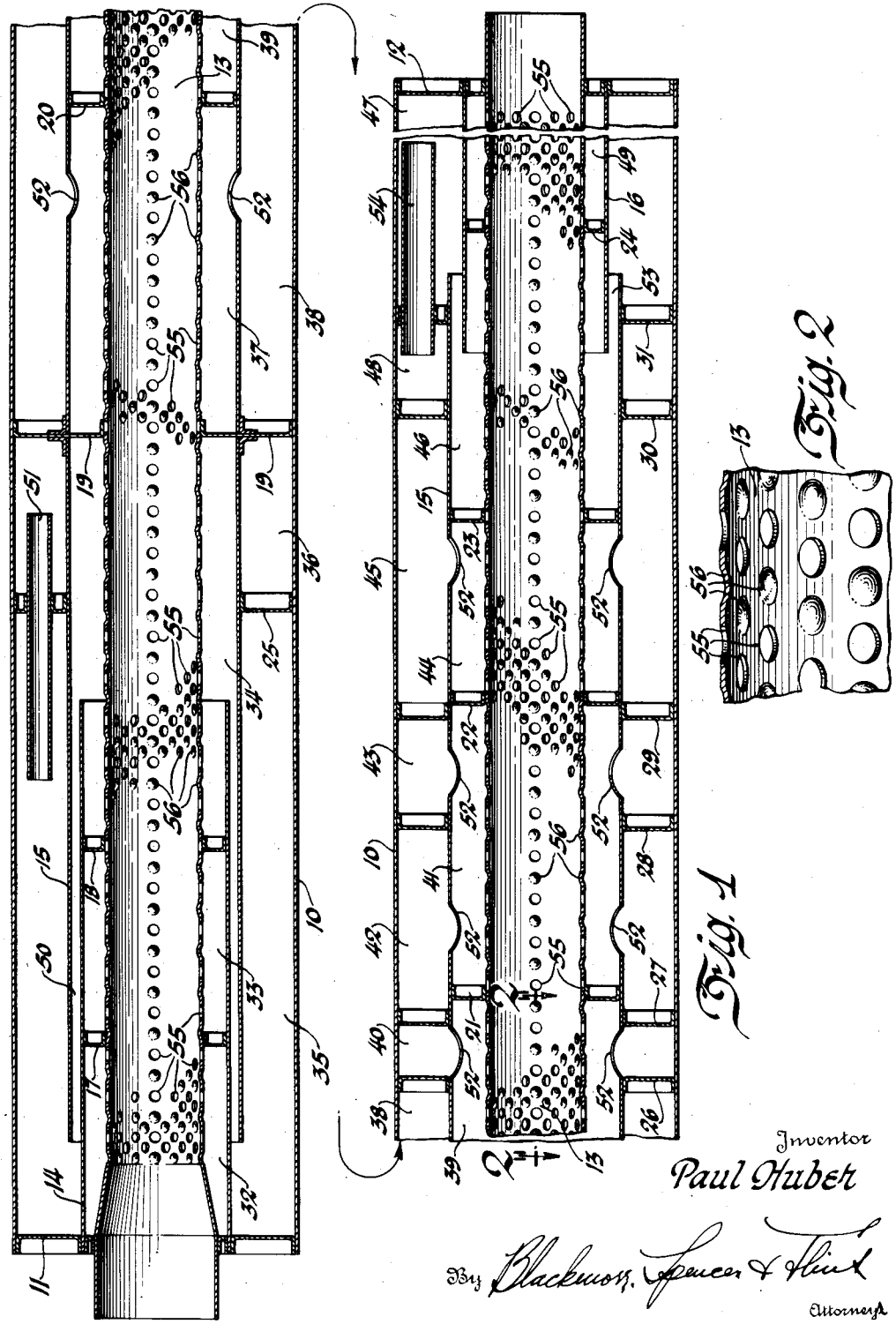

Patented May 30, 1939

2,160,332

UNITED STATES PATENT OFFICE 2,160,332

SILENCER

Paul Huber, Milford, Mich., assignor to General Motors Corporation, Detroit, Mich., a corporation of Delaware Application January 23, 1937, Serial No. 121,997

3 Claims. (Cl. 181—48)

This invention has to do with silencers which include ducts through which gases and sound waves travel and side branches which are connected to the ducts by orifices in the ducts and has for its object to provide a silencer of this type with a duct which is so constructed that a relatively large orifice or relatively large orifices may be employed to connect the side branch or side branches to the duct without giving rise to a whistling noise.

For a better understanding of the nature and objects of this invention, reference is made to the following specification wherein there is described the preferred embodiment of the invention which is illustrated in the accompanying drawing.

In the accompanying drawing:

The two parts of Figure 1 constitute a longitudinal section through a resonator silencer which includes a center tube in accordance with my invention.

Figure 2 is an enlarged fragmentary section through the center tube of the silencer taken as indicated by the line 2—2 of Figure 1.

The silencer which is shown in the drawing includes an imperforate cylindrical shell 10 in whose ends there are secured heads 11 and 12. Through the heads 11 and 12 extend central orifices which are connected by a center tube 13 which extends through and is secured in the orifices and with the shell 10 and its heads 11 and 12 defines a closed annular compartment.

The annular compartment defined by the shell 10, its heads 11 and 12 and the center tube 13 is divided into resonance chambers 32 to 49, inclusive, by annular partitions 17 to 31, inclusive, and cylindrical partitions 14, 15 and 16 which encircle the center tube and are encircled by the shell. The chamber 34 is connected to the chamber 35 by the annular aperture 50 between the overlapping portions of the cylindrical partitions 14 and 15 and the chamber 35 is connected to the chamber 36 by the tube 51 which extends through the annular partition 25. The chambers 37, 39, 41 and 44 are connected, respectively, to the chamber 38, the chamber 40, the chambers 42 and 43 and the chamber 45 by orifices 52 in the cylindrical partition 15. The chamber 46 is connected to the chamber 47 by the annular aperture 53 between the overlapping portions of the cylindrical partitions 15 and 16 and the chamber 47 is connected to the chamber 48 by the tube 54 which extends through the annular partition 31. The chambers 32, 33 and 49 are not connected to any other chambers.

The center tube 13 is riddled with perforations 55 which connect the chambers 32, 33, 34, 37, 39, 41, 44, 46 and 49 directly to it and with the chambers 32 to 49, the annular apertures 50 and 53, the tubes 51 and 54 and the orifices 52 define simple resonators 32—55, 33—55 and 49—55 and compound resonators 36—51—35—50—34—55, 38—52—37—55, 40—52—39—55,
43—42—52—41—55,
45—52—44—55 and 48—54—47—53—46—55.

Between each of the perforations 55 and the end of the center tube through which gases enter the silencer, there is formed in the wall of the center tube an inwardly projecting circular bulge 56 whose diameter is about equal to that of the perforation. While the sizes of the bulges and their distances from their respective perforations is not critical, it may be well to state, just as a matter of example, that I have found parti-spherical bulges three-sixteenths of an inch ($\frac{3}{16}$″) in diameter with centers spaced one-quarter of an inch ($\frac{1}{4}$″) from the centers of their respective perforations and one-thirty-second of an inch ($\frac{1}{32}$″) deep satisfactory in a center tube with circular perforations three-sixteenths of an inch ($\frac{3}{16}$″) in diameter.

The silencer shown in the drawing was designed for installation in the exhaust system of an internal combustion engine with the end of the center tube 13 which projects through the head 11 connected to the exhaust pipe and the other end of the center tube 13 to the tail pipe of the engine so that the exhaust gases of the engine pass through the center tube from the end first mentioned toward the end last mentioned in the course of their travel toward the atmosphere. The simple resonators 32—55, 33—55 and 49—55 and the compound resonators 36—51—35—50—34—55, 38—52—37—55, 40—52—39—55, 43—42—52—41—55, 45—52—44—55 and 48—54—47—53—46—55 are, of course, so tuned in the manner set forth in British Patent No. 391,180 that they respond to and attentuate by resonance sound waves of preselected frequencies which occur in the exhaust system of the engine on which the silencer is installed. The bulges 56 deflect the exhaust gases which travel through the center tube 13 away from and prevent them striking the edges of the perforations 55 and thus avert a whistling noise in the silencer.

Although I have described and shown my invention applied only to a resonator silencer for the exhaust system of an internal combustion engine, it may be applied to any kind of silencer which includes a duct through which gases and sound waves travel and a side branch connected to the duct irrespective of which it is used.

I claim:

1. In a silencer through which gases travel and sound waves enter: means defining a duct and a chamber which communicates with the duct as a side branch; the mentioned means being so arranged that the gases travel through the duct substantially to the exclusion of the chamber; the wall of the duct being bulged inwardly in advance of the means of communication between the chamber and the duct to deflect gases away from the means of communication and thus avert the production of a whistling noise.

2. In a silencer through which gases travel and sound waves enter: means defining a tube of which a portion is riddled with perforations and a chamber which encircles a portion of the tube which is riddled with perforations and communicates as a side branch with the tube through the perforations in the portion of it it encircles; the mentioned means being so arranged that the gases travel through the tube substantially to the exclusion of the chamber; and a bulge within the tube in advance of each of the perforations to deflect gases away from the perforations and thus avert the production of a whistling noise.

3. In a silencer through which gases travel and sound waves enter: means defining a tube of which a portion is riddled with perforations and a chamber which encircles a portion of the tube which is riddled with perforations and communicates as a side branch with the tube through the perforations in a portion of it it encircles; the mentioned means being so arranged that the gases travel through the tube substantially to the exclusion of the chamber and the side branch being so tuned that it responds to and attenuates by resonance sound waves of a preselected frequency which travel through the tube; and a bulge within the tube in advance of each of the perforations to deflect gases away from the perforations and thus avert the production of a whistling noise.

PAUL HUBER.